(No Model.)
A. BINNIE.
APPARATUS FOR THE MANUFACTURE OF GAS.
No. 282,695. Patented Aug. 7, 1883.
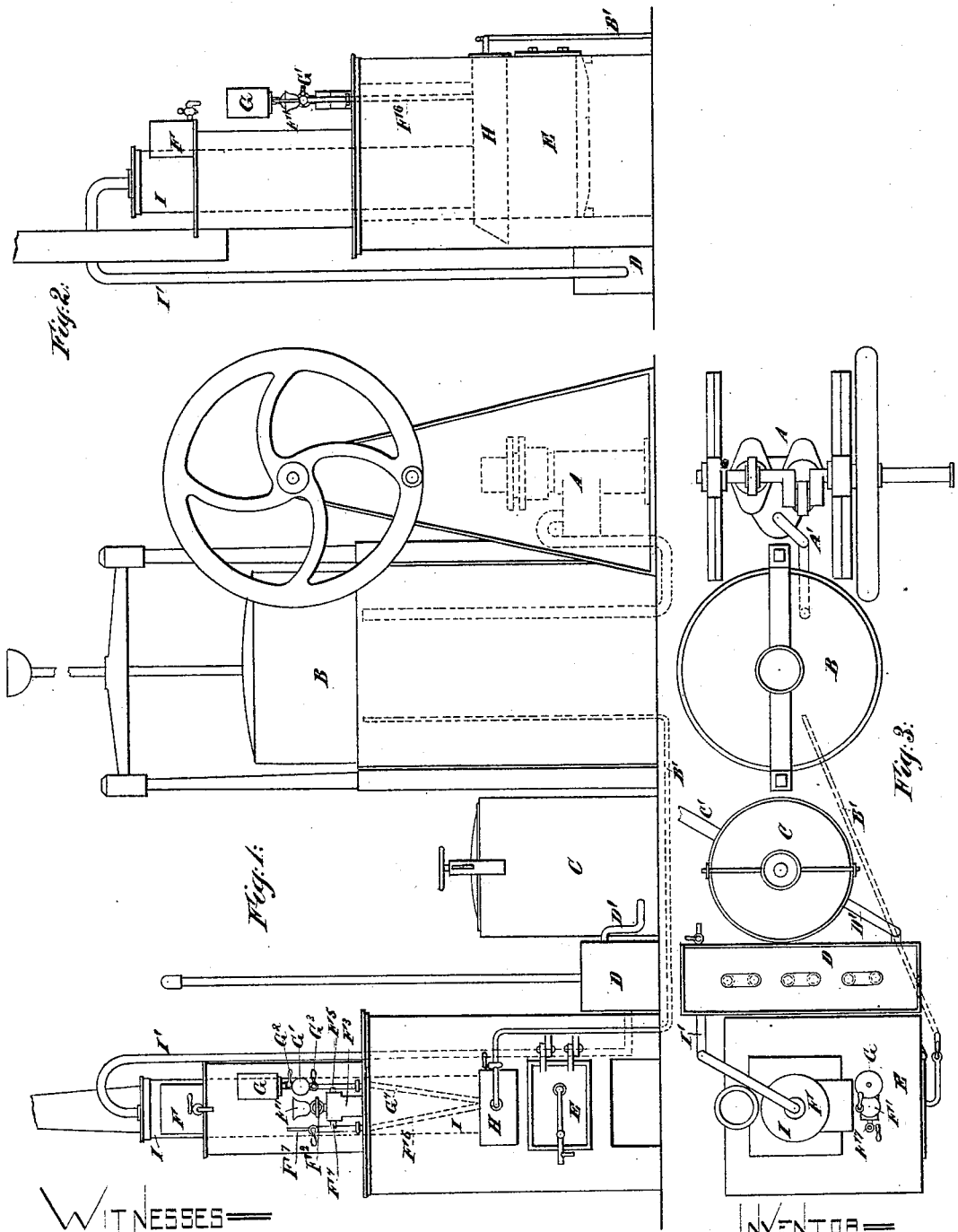

UNITED STATES PATENT OFFICE.

ALEXANDER BINNIE, OF MAORI HILL, NEAR DUNEDIN, ASSIGNOR TO EDWARD WILLS U'REN AND JOHN WAY U'REN, BOTH OF DUNEDIN, NEW ZEALAND.

APPARATUS FOR THE MANUFACTURE OF GAS.

SPECIFICATION forming part of Letters Patent No. 282,695, dated August 7, 1883.

Application filed June 23, 1882. (No model.) Patented in New Zealand January 21, 1882, No. 586; in Tasmania March 31, 1882, No. 226; in Victoria April 6, 1882, No. 3,194; in South Australia April 24, 1882, No. 247; in Queensland June 7, 1882; in England June 7, 1882, No. 2,673; in New South Wales June 21, 1882; in Belgium July 31, 1882; in Western Australia September 9, 1882; in Austria October 4, 1882, and in France October 26, 1882.

*To all whom it may concern:*

Be it known that I, ALEXANDER BINNIE, a subject of the Queen of Great Britain, residing at Maori Hill, near Dunedin, in the provincial district of Otago, in the British Colony of New Zealand, brick-layer, have invented an Improved Apparatus for the Manufacture of Gas for Illuminating and other Purposes; and I do hereby declare that the following is a full, clear, and exact description of the invention, which will enable others skilled in the art to which it appertains to make and use the same.

My improved process of manufacturing gas for illuminating and other purposes consists, first, in a novel combination of materials for the purpose, and, second, in the peculiar condition to which they are reduced before and in the act of combination.

My novel combination of materials is air, water, and animal fats or vegetable or mineral oils; but the air must be under pressure, the water reduced to the condition of superheated steam, and the animal fats or vegetable or mineral oils to heated gases before these three ingredients are combined together to form my gas; and, further, I find it necessary to combine them in very small quantities at a time. Thus the water and animal fats, (the latter being first reduced to a fluid,) or vegetable or mineral oils, are treated in drops and the air in proportionately small quantities. These ingredients are conveyed to a generator kept at a cherry-red heat, and are there intermixed the one with the other in the form of gas and conveyed away to a condenser and purifier, and from there to a gas-holder, as is commonly the case in gas-manufacture.

Although I have stated that vegetable or mineral oils may be substituted for melted animal fat, I much prefer the latter, because it makes a better gas, is cheaper, and will not condense, whereas vegetable oils are expensive, and gas made from mineral oils will condense more or less in the gas-holder.

My improved apparatus consists of a novel combination of essential features in a gas-producing apparatus, some novel contrivances necessitated by the process and their combination with others, which are well known.

The accompanying drawings form a part of this specification, and illustrate what I consider the best means for carrying out the invention.

Figure 1 is a front elevation of the apparatus. Fig. 2 is an end elevation, showing the furnace and its contents. Fig. 3 is a plan view of the apparatus.

Similar letters of reference indicate corresponding parts in all the figures.

A is an air-pump; B, an air-holder; C, a purifier; D, a condenser; E, a furnace; F, the reservoir for animal fat or its alternatives; G, the water-reservoir; H, the generator; I, the retort attached thereto. A' is a pipe from the air-pump to the holder. B' is a pipe from the holder to the gas-generator. F' is a cup for receiving the drops of melted fat or its alternatives as they fall from the reservoir F. $F^2$ is a pipe leading from the bottom of such cup to very nearly the bottom of chamber $F^3$, from either side of the upper part of which are connecting-pipes $F^4$ and $F^5$, the former leading into a down pipe, $F^6$, which reaches down to the generator H. G' is a glass bulb just below the water-reservoir G and between the taps $G^2$ and $G^3$, the latter being at the top of a down pipe, $G^4$, (into which connecting-pipe $F^5$ leads,) which also reaches down to the generator H. At the top of the retort is a pipe, I', leading to the condenser, from which pipe D' leads to the purifier, another pipe, C', leading from thence to a gas-holder. (Not shown.)

The mode of operation is as follows: I first charge the air-holder with air by means of the air-pump, then kindle a fire in the furnace, and when the generator H and retort I have attained a cherry-red heat I open the taps leading from the air, water, and animal-fat (or its alternatives) reservoirs, respectively, the water and animal fat (reduced to a liquid) or its alternatives being supplied only in drops, so that in these minute quantities they may reach and be heated in the generator, the water being converted into steam as it descends its pipe $G^4$, the liquid fat being first received into chamber $F^3$, from thence overflowing through connection $F^4$ into and down pipe $F^5$, from whence it is discharged in a gaseous condition into the generator. The three ingredients are here superheated, and combine together into a gas passing upward through the retort I into pipe I', from whence it passes into an ordinary condenser, D, and from thence into an ordinary gas-purifier, C, and lastly from thence into an ordinary gas-holder. There is therefore nothing new about any of the parts of this apparatus except in the furnace, its contents, and immediate connections, as will be hereinafter more specifically set forth.

With regard to the proportions and speed of feeding the apparatus, I have found that in an apparatus of the size indicated by the drawings sixty drops of liquid fat and fifteen drops of water per minute, with a constant air-pressure of about one-tenth of a pound to the inch supplied through the contracted nozzle of an inch pipe, makes gas of a reasonably-good quality. As a means of testing the quality of the gas while in course of manufacture, I attach a tap, $F^7$, to the upper part of pipe $F^6$. If this tap be opened and the gas ignited, it will burn blue if too much air is being supplied; it will sparkle if too much steam is being supplied, and it will smoke if too much liquid fat is being supplied. If too little water is being supplied, it will burn with a yellow glare; if too little air, it will burn blue in addition to the yellow glare; and if too little animal fat or vegetable or mineral oils is being supplied, it will scarcely burn at all.

Referring to the water-reservoir, it will be at once understood that when tap $G^2$ is opened $G^3$ must be closed, as it only is opened in order to fill the glass bulb G' between them. In cup F' there is no mechanical valve, the liquid fat itself forming a valve. The generator H and retort I, I prefer to make of iron; but the materials of which this, as well every other part of the apparatus herein shown and described, may be made, is perfectly well known to every one possessed of ordinary skill in the art to which the invention refers, and therefore I do not claim any specialty in, nor do I confine myself to, any particular materials of which such apparatus may be made or manufactured; but What I do claim as my improved process of and apparatus for the manufacture of gas for illuminating and other purposes is—

In a gas apparatus, and in combination with the oil-reservoir F and water-reservoir G, the cup F', located beneath and separate from the reservoir, the pipe $F^2$, chamber $F^3$, connecting-pipes $F^4$ and $F^5$, the down pipe $F^6$, generator H, and retort I, all combined and arranged to serve as set forth.

ALEXANDER BINNIE.

Witnesses:
W. O. A. BARR,
CHARLES WATT.